United States Patent [19]

Inose et al.

[11] Patent Number: 5,050,029
[45] Date of Patent: Sep. 17, 1991

[54] LID LOCK MEMBER TAPE CASSETTE WITH LIGHT LEADING

[75] Inventors: Takanori Inose, Saitama; Shin Sasaki, Miyagi, both of Japan

[73] Assignee: Sony Corporation, Tokyo, Japan

[21] Appl. No.: 483,449

[22] Filed: Feb. 22, 1990

[30] Foreign Application Priority Data

Feb. 23, 1989 [JP] Japan .................................. 1-043654

[51] Int. Cl.$^5$ ............................................. G11B 23/02
[52] U.S. Cl. .................................................... 360/132
[58] Field of Search ......................... 360/132; 242/199

[56] References Cited

U.S. PATENT DOCUMENTS 4,884,158 11/1989 Pertzsch ........................... 242/199 X Primary Examiner—A. J. Heinz
Attorney, Agent, or Firm—Philip M. Shaw, Jr.

[57] ABSTRACT

A tape cassette having a lid pivotally supported at two side walls of the cassette housing so as to open or close a tape withdrawing mouth has a lid lock member for locking said lid at a closed position. Upon use, the tape cassette is loaded on a recording and/or reproducing apparatus having an optical tape end sensing device formed of a light emitting element and a light receiving element. The lid lock member includes a light leading cover or tunnel piece which coincides with a light path which extends from the light emitting element to the light receiving element. This tape cassette also has an opening formed through its side walls so as to communicate with the light path, wherein an outer end portion of the tunnel piece is inserted into the opening portion.

20 Claims, 9 Drawing Sheets

LID LOCK MEMBER TAPE CASSETTE WITH LIGHT LEADING

BACKGROUND OF THE INVENTION

1. Field of the Invention

The present invention relates generally to tape cassettes and more particularly relates to a tape cassette having a light path for optically sensing the end of a magnetic tape.

2. Description of the Prior Art

A recording and/or reproducing apparatus, such as a videotape recorder or the like, is provided with a tape end sensing device having a light emitting element and a light receiving element for sensing the end of a magnetic tape. This type of recording and/or reproducing apparatus is constructed such that when a tape cassette is loaded into the apparatus, a lamp is inserted into the cassette housing. Light emitted from the lamp travels along a detection light path which intersects a predetermined tape path and passes through an opening formed in the side wall of the cassette housing to reach a photo cell provided as the light receiving element. When a transparent leader tape attached to the tape end crosses the detection light path, the light emitted from the lamp passes through the leader tape and is received by the light receiving element, thereby sensing the tape end. This can be used, for example, to stop a tape transport driving device.

Various types of tape cassettes are shown in the prior art for use with such a recording and/or reproducing apparatus. According to these proposals, a light-leading cover or tunnel piece is provided at the exit side of the lamp so that only light from the lamp which crosses the tape path is received by the light receiving element, and stray light other than that passing along the detection light path can be prevented from reaching the light receiving element.

For example, Japanese Utility Model Laid-Open Gazettes Nos. 62-51584 and 62-57983 and so on describe a first type of tape cassette, wherein the tunnel piece for introducing light from the lamp along the detection light path in the cassette housing is integrally formed with a lid lock member for a lid which opens and closes the tape mouth of the cassette housing, and a second type of tape cassette in which the tunnel piece is secured to the bottom portion of the cassette housing.

In the above-mentioned first type of tape cassette, the tunnel piece is formed as a protrusion only on the inner surface of the lid lock member. This allows an undesired external light which is incident on the detection light path to reach the light receiving element through a space between the bottom inside surface of the cassette housing and the inner surface of the lid lock member. This creates a substantial possibility that the tape end will be misdetected.

In the above-mentioned second type of tape cassette, in which the tunnel piece is secured to the bottom portion of the cassette housing, the outer end of the tunnel piece extends nearly to the side wall of the cassette housing, thereby preventing external light from being introduced into the detection light path. In this case, however, the assembly process for attaching the tunnel piece to the bottom portion of the cassette housing becomes cumbersome. In addition, a concave portion must be formed on the inside of the lid lock member in order to allow room for the tunnel piece. This has the disadvantage that the mechanical strength of the lid lock member will be decreased.

OBJECTS AND SUMMARY OF THE INVENTION

Therefore, it is an object of the present invention to provide an improved tape cassette which can eliminate the aforementioned problems encountered in use of tape cassettes of the prior art.

More specifically, it is an object of the present invention to provide an improved tape cassette having a lid lock member which includes a light leading cover or tunnel piece for passing an end-sensing light therethrough which can positively sense a tape end.

It is another object of the present invention to provide an improved tape cassette having a lid lock member which includes a tunnel piece for passing an end-sensing light therethrough which can be simply constructed.

It is still another object of the present invention to provide an improved tape cassette having a lid lock member which includes a tunnel piece for passing an end-sensing light therethrough which can be made at low cost.

It is an additional object of the present invention to provide an improved tape cassette having a lid lock member which includes a tunnel piece for passing an end-sensing light therethrough which is for use with a recording and/or reproducing apparatus such as a videotape recorder or the like having a tape end sensing device.

In accordance with an aspect of this invention, there is provided a tape cassette having a lid supported at two side walls of a cassette housing so as to open and/or close a tape mouth and a lid lock member for locking the lid at a closed position. The tape cassette is loaded on a recording and/or reproducing apparatus having an optical tape end sensing device formed of a light emitting element and a light receiving element. The lid lock member includes a light leading cover or tunnel piece which covers the light path extending from the light emitting element to the light receiving element. The tape cassette housing includes an opening formed through its side wall which coincides with the light path, wherein an outer end portion of the tunnel piece is inserted into the opening in the side wall.

The features and advantages described in the specification are not all inclusive; particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF PREFERRED EMBODIMENTS

FIGS. 1 through 12 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
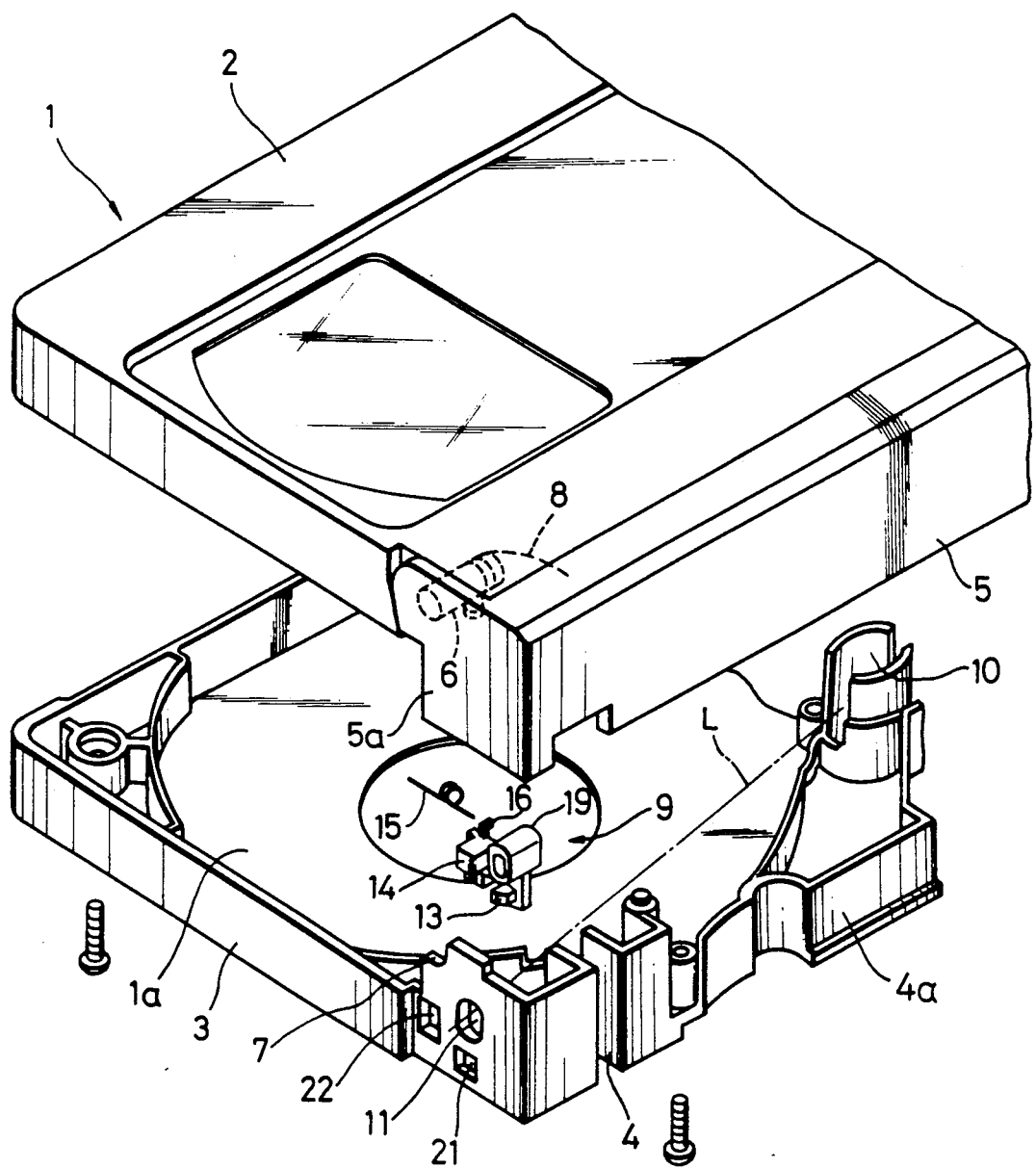
FIG. 1 is an exploded perspective view illustrating a tape cassette according to a first embodiment of the present invention.
Figure 2:
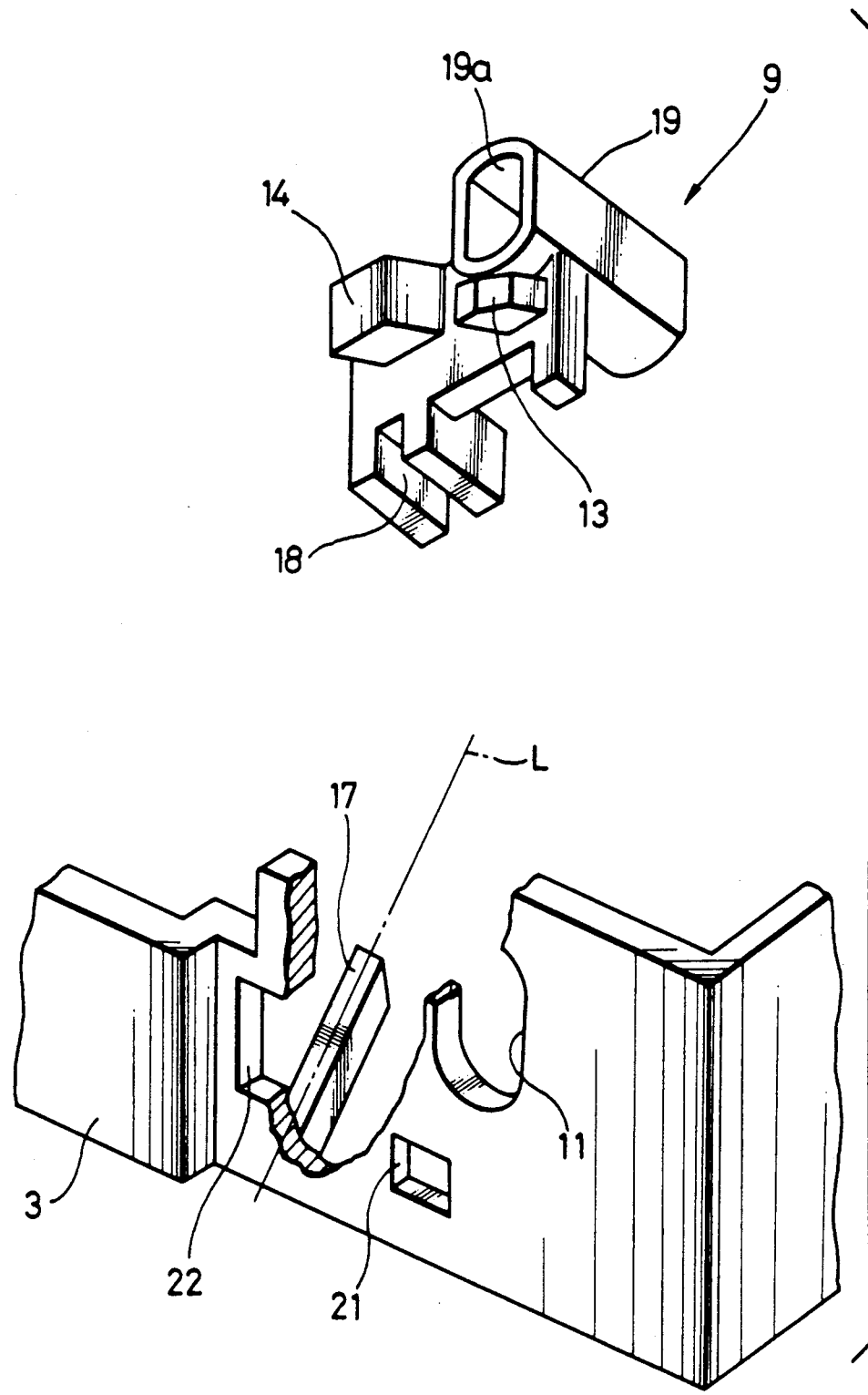
FIG. 2 is a cross-sectional exploded perspective view of a main portion of the tape cassette shown in FIG. 1.
Figure 3:
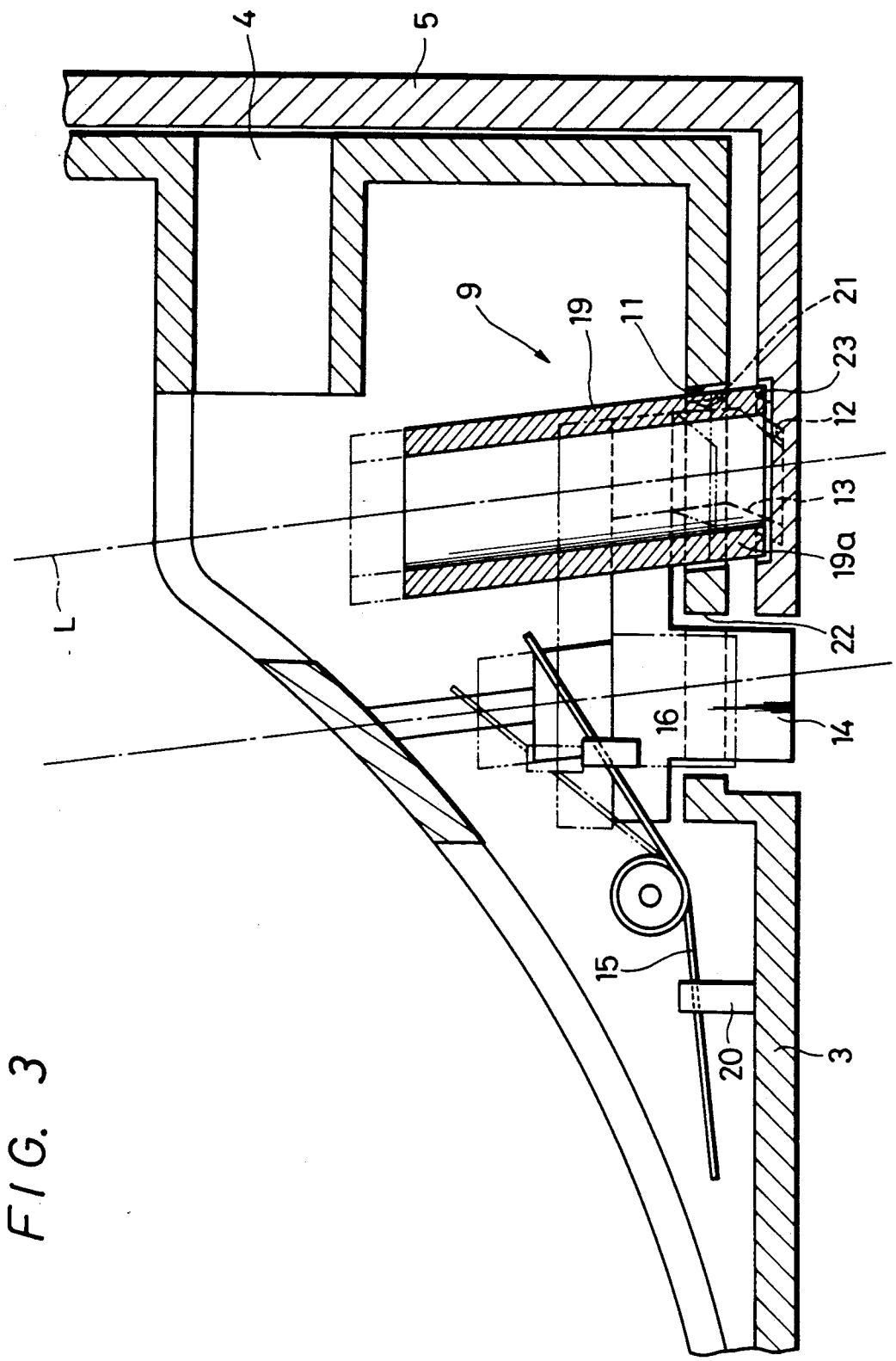
FIG. 3 is a planar view of a horizontal section of a main portion of the tape cassette shown in FIG. 1.

FIGS. 1 to 3 show a first embodiment of the present invention. FIG. 1 illustrates a videotape cassette of the type used with a videotape recorder.

In FIG. 1, a cassette housing 1 is comprised of an upper cassette half 2 and a lower cassette half 3. Within cassette housing 1 is tape reel accommodating portion 1a, which is defined by portions of the upper cassette half 2 and lower cassette half 3 so as to fit a pair of reels (not shown) which contain a magnetic tape having transparent leader portions on each end. A tape withdrawing mouth 4 is formed at the front wall side 4a of the cassette housing 1. A flat front lid 5 having an internal configuration of a U-shape is attached to upper cassette half 2 such that it covers the front wall 4a by support shafts 6, which are formed on and protrude from the inside surfaces of left and right side walls 5a of the front lid 5. Support shafts 6 are inserted into apertures 7 formed through the front portions of the side walls of the upper and lower cassette halves 2 and 3, thereby allowing front lid 5 to be freely opened or closed.

The front lid 5 is spring-biased in the closing direction by springs 8 attached to the support shafts 6, and is locked in its closed state by a lid lock member 9 provided within the cassette housing 1.

The lid lock member 9 is located on tape reel accommodating portion 1a, toward the front of the cassette housing 1, and attached so that it may be slidably moved inwardly and outwardly parallel to an optical axis of a tape end detection light path L. Detection light path L extends from a cylindrical light emitting portion 10 to an opening 11 formed through the front portion of the side wall of lower cassette half 3, and intersects a tape path defined between tape reel accommodating portion 1a and tape withdrawing mouth 4. Cylindrical light emitting portion 10 is formed on lower cassette half 3 at the front central portion of the reel accommodating portion 1a and is shaped to receive a light emitting element, such as a lamp or the like. The opening 11 opposes the inside of the side wall portion 5a of the front lid 5.

As shown in FIGS. 2 and 3, the lid lock member 9 has a locking protrusion 13 which is to be engaged with a cavity 12 formed on the inside of one side wall portion 5a of lid 5, a lock-releasing protrusion 14 corresponding to a lock-releasing operation member provided at the videotape recorder side (not shown), and an engaging member 16 engaged with a locking spring 15. As shown in FIG. 2, on the bottom of the lid lock member 9, there is a guide groove 18 for insertion of a guide rib 17, which is provided on the bottom wall of the lower cassette half 3 and is parallel to the optical axis of the detection light path L. On the upper side of the lid lock member 9, there is provided a cylindrical light leading cover or tunnel piece 19 through which the optical axis of the detection light path L passes. An outside end portion 19a of the tunnel piece 19 is protruded in the same direction as the locking protrusion 13 so that it is inserted into the opening 11 formed through the side wall of lower cassette half 3.

When the guide rib 17 is inserted into the guide groove 18 of lid lock member 9, lid lock member 9 may be moved inwardly and outwardly along guide rib 17, i.e. parallel to the optical axis of detection light path L. Lid lock member 9 is spring-biased to the outside direction, i.e. toward the side wall of the cassette, by the locking spring 15, which is attached at one end to the engaging portion 16 and at the other end to a protrusion 20 located on lower cassette half 3. As a result, the locking protrusion 13 and the lock-releasing protrusion 14 of the lid lock member 9 are caused to project from apertures 21 and 22 respectively, both of which are located in the side wall of the lower cassette half 3, and outside end portion 19a of the tunnel piece 19 is inserted into the opening portion 11.

When the lid lock member 9 is slidably moved outward, the locking protrusion 13 is engaged with the cavity 12 formed on the inside surface of the side wall portion 5a of the front lid 5, thereby locking front lid 5 closed. Simultaneously, the end face of the outside end portion 19a of the tunnel piece 19 is inserted into a concave portion 23 formed on the inner surface of the side wall portion 5a of the front lid 5. This is the normal position when the cassette is not in use in a videotape recorder.

When a tape cassette of this first embodiment is loaded on a videotape recorder, the lock-releasing protrusion 14 of the lid lock member 9 comes in contact with a lock-releasing operation member (not shown) of the videotape recorder so that it is pushed inside cassette housing 1. As a result, the lid lock member 9 is slid inwardly along the guide rib 17, thereby causing the locking protrusion 13 to be disengaged from the cavity 12 of the front lid 5. This releases the front lid 5 from the locked state, and it is then rotated around the support shafts 6 on the two side wall portions 5a to open the tape withdrawing mouth 4. Simultaneously, the outside end portion 19a of the tunnel piece 19 is removed from opening 11 and a light emitting element such as a lamp or the like provided on the videotape recorder is inserted into light emitting portion 10.

Once the tape has been inserted in the videotape recorder, the lock releasing protrusion 14 of the lid lock member 9 is no longer pressed, so that the lid lock member 9 is again slid outwardly by the locking spring 15, thereby causing the locking protrusion 13 and the lock releasing protrusion 14 to protrude from the apertures 21 and 22, and the outer end portion 19a of the light leading cover 19 to again be inserted into the opening portion 11.

Light emitted from the light emitting element inserted into the light emitting portion 10 forms the detection light path L. If this light passes through the transparent leader tape which is attached to the ends of the magnetic tape, it then passes through the light leading cover 19 of the lid lock member 9 through the opening portion 11 (into which the outer end portion 19a is inserted) to the light receiving element provided in the videotape recorder.

When the light receiving element receives light, the videotape recorder determines that the magnetic tape is at its end portion, and stops the tape.

As described above, in this embodiment, the lid lock member 9 locks and unlocks the front lid 5 by sliding in the same direction as the lock releasing protrusion 14, so that the lid lock member 9 can be operated smoothly. This use of sliding movements of the lid lock member 9 to lock and unlock the front lid 5 allows the operating range of the lid lock member 9 to be reduced as compared to lid lock members which operate by rotating, thus making it possible to reduce the space which must be provided for the operation of lid lock member 9.

The insertion of outer end portion 19a of the tunnel piece 19 of the lid lock member 9 into the opening portion 11 prevents undesired external light from entering the opening portion 11. Only light passing through the correct light path L can travel through the tunnel piece 19 and reach the light receiving element, thus preventing false signals that the end of the tape has been detected. Further, when the front lid 5 is closed, the outer end portion 19a of the tunnel piece 19 is inserted into the concave portion 23 formed on the inside of the front lid 5, such that the opening portion of the tunnel piece 19 is perfectly closed to prevent dust or other particles from entering the cassette housing 1.

Figure 4:
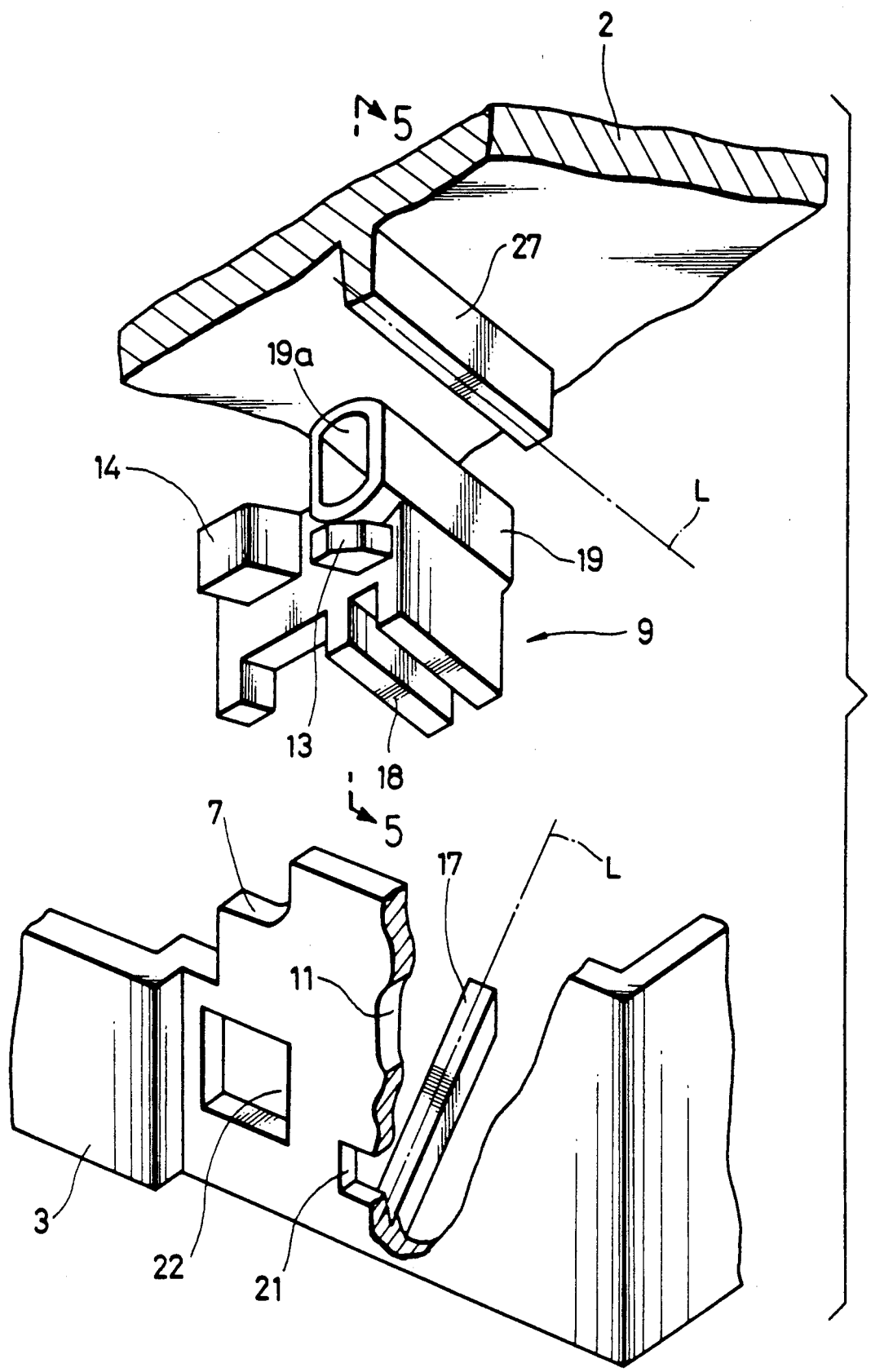
FIG. 4 is a cross-sectional exploded perspective view of a main portion of a tape cassette according to a second embodiment of the present invention.
Figure 5:
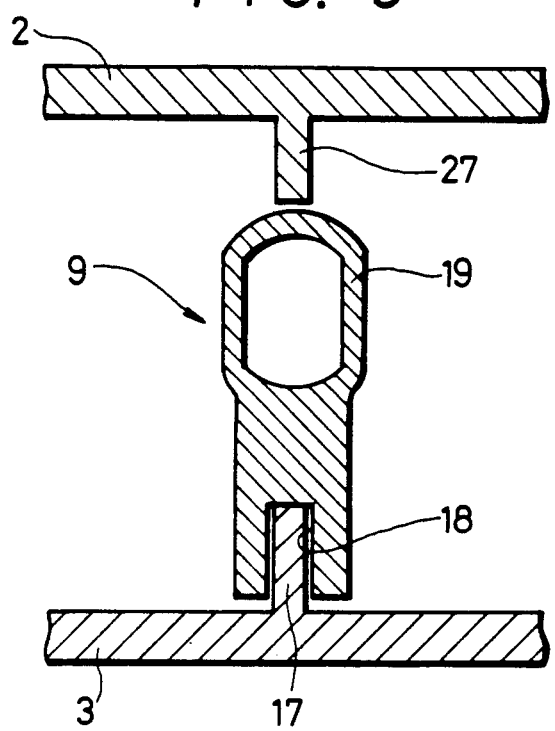
FIG. 5 is a cross-sectional view of a section of the tape cassette of FIG. 4, taken along line 5—5 of FIG. 4.

A second embodiment of the present invention is shown in FIGS. 4 and 5. The second embodiment is a modification of the first embodiment above in which the lid lock member 9 can be pushed down by the upper cassette half so as to prevent the lid lock member 9 from wobbling, thus allowing the lid lock member 9 to slide smoothly. Like parts corresponding to those of FIGS. 1 to 3 are marked with the same reference numbers and thus need not be described in detail.

As shown in FIGS. 4 and 5, in the second embodiment of the present invention, as in the first embodiment, the guide rib 17 is formed on the bottom surface of the lower cassette half 3 under opening 11 and parallel to detection light path L. The guide groove 18 of the lid lock member 9 to be inserted into the guide rib 17 is formed on the underside of the tunnel piece 19. On the inner surface of upper cassette half 2, a guide rib 27 is provided which is also parallel to the light path L and which opposes guide rib 17 such that the guide rib 27 may slide along the top surface of tunnel piece 19 of lid lock member 9.

With this arrangement, when lid lock member 9 slides to lock and unlock front lid 5, it can slide smoothly without wobbling, so that outer end portion 19a of the tunnel piece 19 can be positively inserted into or removed from the opening portion 11. Also, lid lock member 9 can positively lock the front lid 5 without wobbling.

Figure 6:
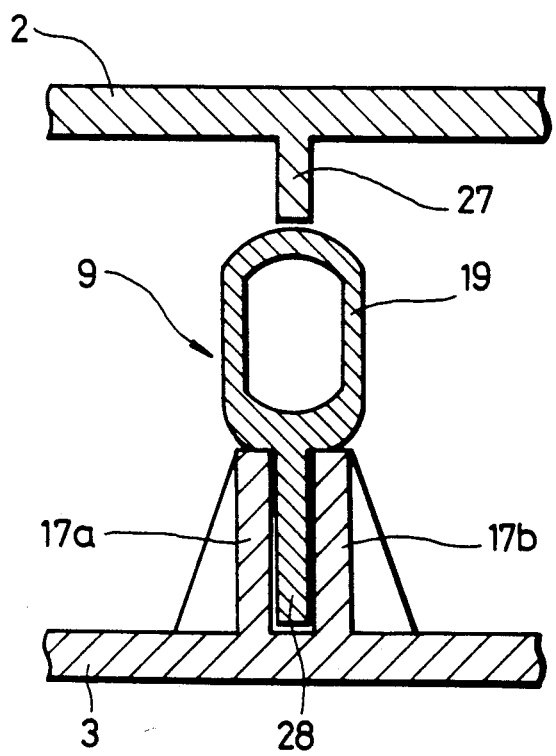
FIG. 6 is a cross-sectional view of a section of the tape cassette of FIG. 4, in a modified example of the second embodiment of this invention.

FIG. 6 illustrates a modification of the second embodiment. Referring to FIG. 6, in this example, the guide rib 17 on the lower cassette half 3 side is by parallel ribs 17a and 17b, and instead of the guide groove 18, a guide rib 28 is formed on the lid lock member 9 side so as to be engaged between the parallel ribs 17a and 17b. As above, support rib 27 is formed on the inside of upper cassette half 2, but now in opposition to the groove between parallel ribs 17a and 17b, and slides along the upper surface of the tunnel piece 19 so that the lid lock member 9 can slide smoothly and positively without wobbling, thus achieving similar results to those in FIG. 5.

Figure 7:
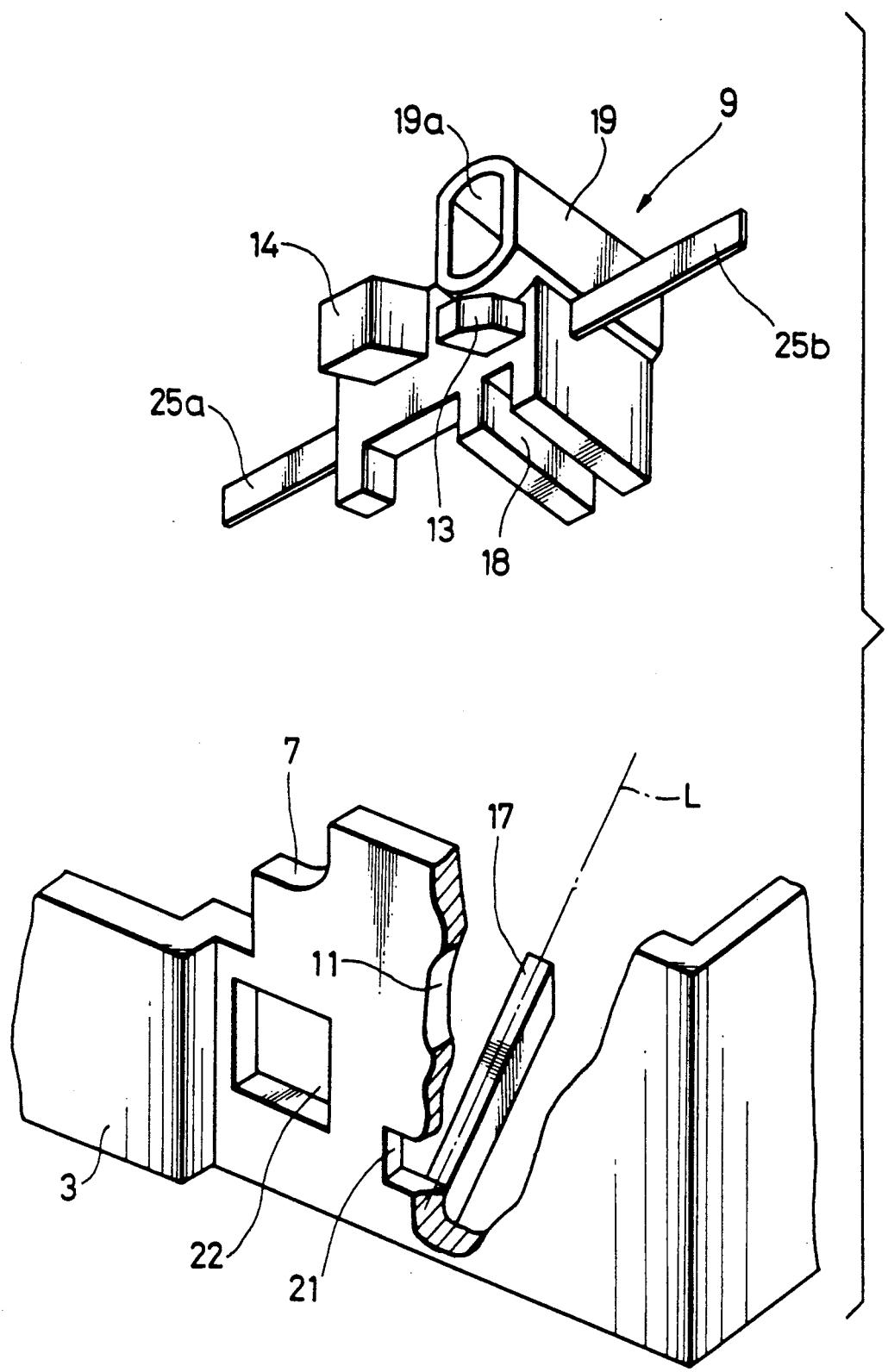
FIG. 7 is a cross-sectional exploded perspective view of a main portion of a tape cassette according to a third embodiment of the present invention.
Figure 8:
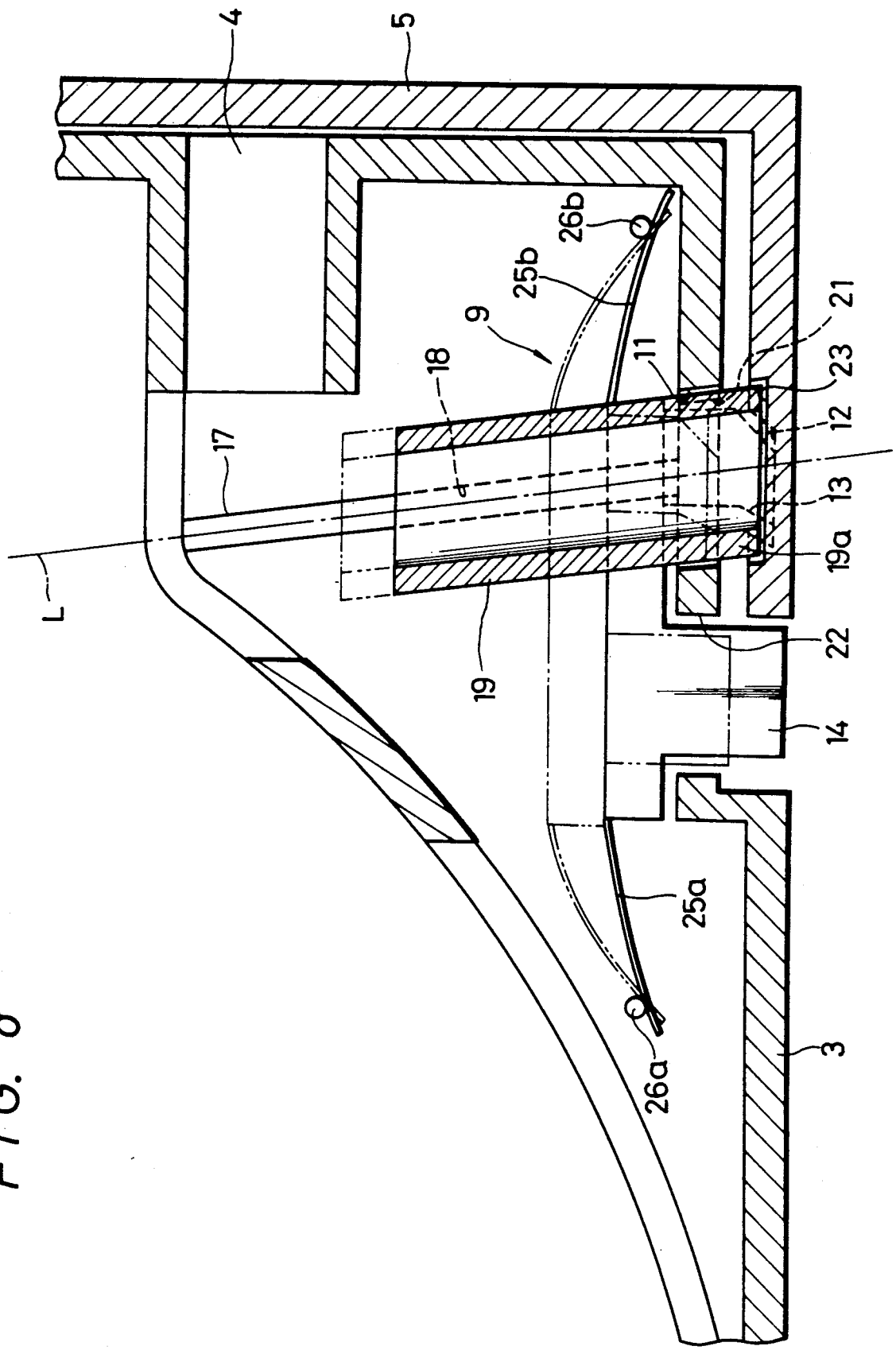
FIG. 8 is an planar view of a horizontal section of a main portion of FIG. 7.
Figure 9:
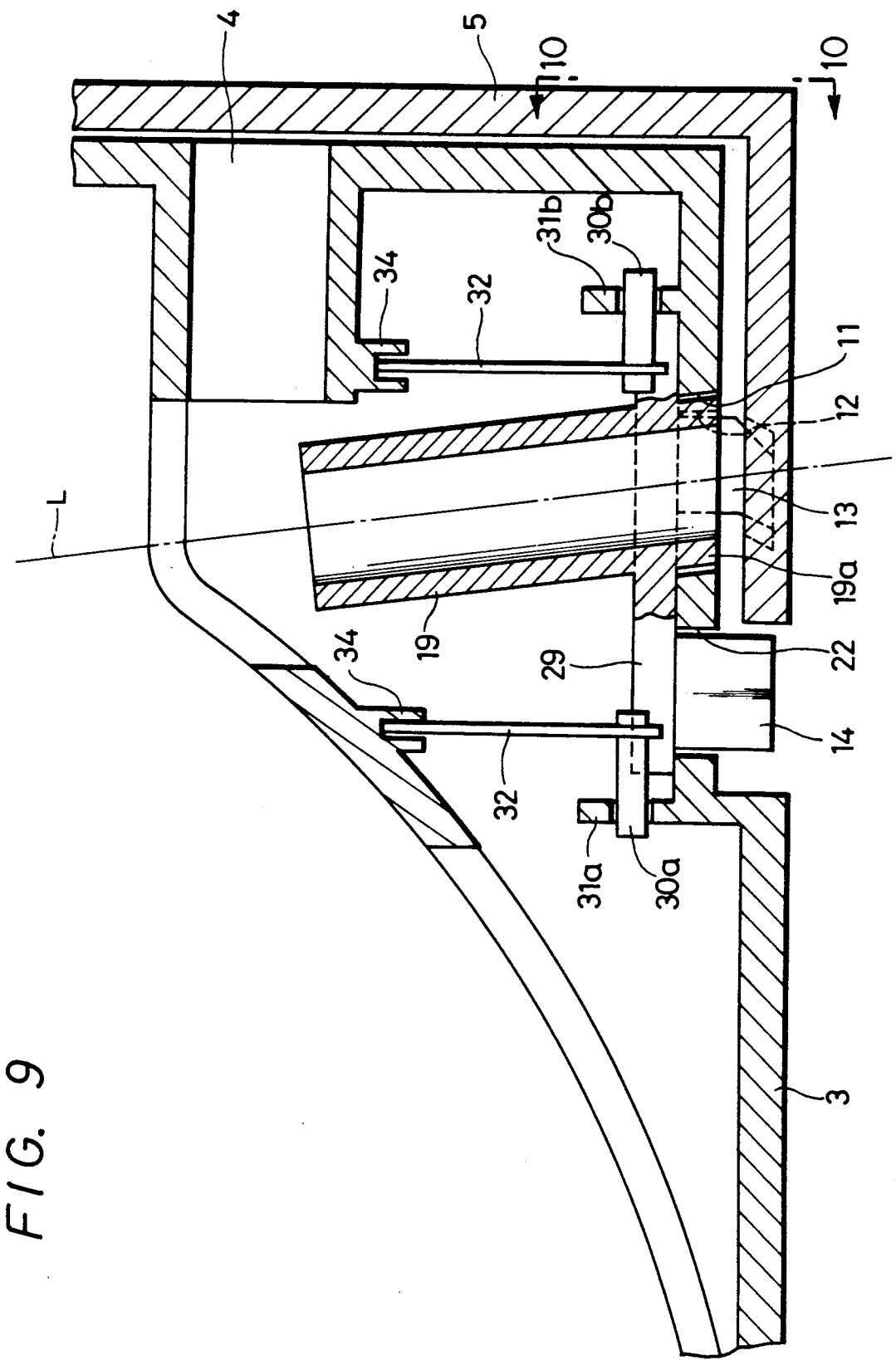
FIG. 9 is a planar view of a horizontal section of a main portion of a tape cassette according to a fourth embodiment of the present invention.

FIGS. 7 and 8 illustrate another modification of the present invention. This modification relates to an improvement of the spring-biasing means for lid lock member 9, and may be used with any of the other embodiments.

As shown in FIGS. 7 and 8, in this modification of the present invention, a pair of springs 25a and 25b are provided on the respective side portions of the lid lock member 9. In the illustrated example, springs 25a and 25b are plastic, of a leaf spring configuration, and integrally formed with lid lock member 9.

When guide rib 17 is inserted into guide groove 18 on the lower surface of lid lock member 9, lid lock member 9 and springs 25a and 25b can slide in the inward and outward directions. The two end portions of the plastic springs 25a and 25b are engaged with engaging protrusions 26a and 26b formed on the bottom surface of the lower cassette half 3 so that the lid lock member 9 is constantly spring-biased to the outside direction.

Since the lid lock member 9 is spring-biased on each side by the plastic springs 25a and 25b, spring-biasing forces of substantially the same magnitude are applied to the lid lock member 9 from both sides. Thus, lid lock member 9 can slide smoothly without wobbling during locking and unlocking, so that the outer end portion 19a of the tunnel piece 19 may be positively inserted into and removed from the opening portion 11, and front lid 5 can be positively locked.

Since the springs 25a and 25b are integrally formed with the lid lock member 9, lid lock member 9 can be easily assembled with lower cassette half 3.

As an alternative to integrally forming springs 25a and 25b with lid lock member 9, a pair of metal leaf springs, wire springs or the like may be used, where one spring is embedded into lid lock member 9 on each side and protrudes as shown in FIG. 7.

Another embodiment of the present invention is shown in FIGS. 9 to 12. In this embodiment, the lid lock member pivots on the lower cassette half so as to be rotatable in the inward and outward directions.

Figure 11:
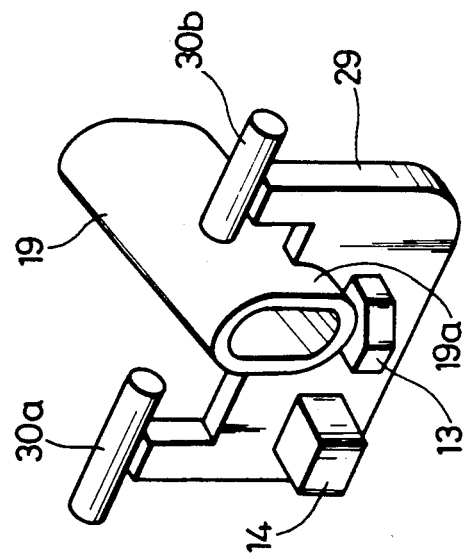
FIG. 11 is a perspective view of one type of lid lock member which is suitable in the application to the tape cassette of FIG. 9.

As shown in FIG. 11, as in the prior embodiments a lid lock member 29 has a locking protrusion 13 and a lock releasing protrusion 14 on the side of the lid lock member facing outwardly. A cylindrical light leading cover or tunnel piece 19 extends mostly inwardly, but outer end portion 19a of cylindrical tunnel piece 19 protrudes outwardly.

Now, however, shaft portions 30a and 30b are integrally formed on the respective sides of the upper edge portion of the lid lock member 29. The shaft portions 30a and 30b pivot on bearing portions 31a and 31b respectively, which are formed on the inside of the side walls of the lower cassette half 3 so that the lid lock member 29 may rotate in the inward and outward directions. Alternatively, lid lock member 29 may rotate only in the inward direction from the inner surface of the side wall.

In the locked position, lid lock member 29 is located so as to come in contact with the inner surface of the side wall of lower cassette half 3. Locking protrusion 13 projects from aperture 21 in the side wall so as to engage with cavity 12 in front lid 5, and lock releasing protrusion 14 projects from aperture 22, as in the previous embodiments. At the same time, again as before, outer end portion 19a of the tunnel piece 19 is inserted into the opening 11.

Similarly to before, lid lock member 29 is spring-biased toward the locked position. In this embodiment, the spring-biasing members are formed by curving wire-shaped spring material or a plate-shaped spring member in substantially a V-letter shape, with circular engaging portions formed on the curved portion so as to be engaged with the shaft portions 30a and 30b of the lid lock member 29.

Figure 12A:
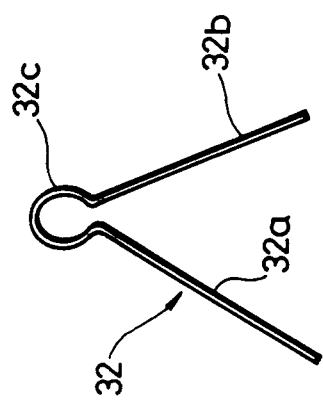
FIGS. 12A and 12B are perspective views of spring-biasing members used in the lid lock member of FIG. 11.

FIG. 12A shows an example of a spring-biasing substantially a V-letter shape to provide two leg portions 32a and 32b. A circular engaging portion 32c is formed on the curved portion between the two leg portions 32a and 32b so as to engage with the shaft portion of the lid lock member 29.

Figure 12B:
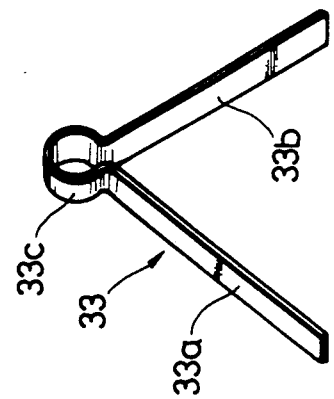
Figure 10:
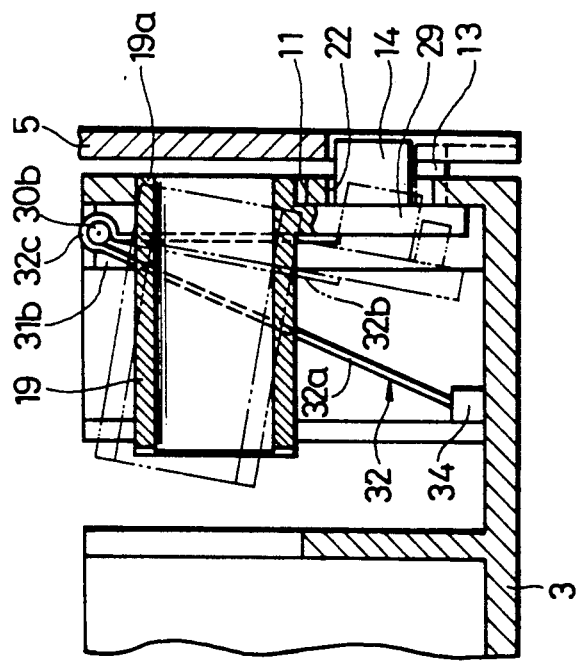
FIG. 10 is a cross-sectional view of the tape cassette of FIG. 9, taken along line 10—10 in FIG. 9.

FIG. 12B shows another example of a spring-biasing member 33, here formed by curving a metal plate-shaped spring material or a synthetic resin plate-shaped spring material in substantially a V-letter shape to provide two leg portions 33a and 33b. Again a cylindrical engaging portion 33c is formed on the curved portion between the leg portions 33a and 33b so as to engage with shaft portions 30a and 30b.

Spring-biasing members 32 and 33 may be engaged with each of the shaft portions 30a and 30b of the lid lock member 29 at the engaging portion 32c or 33c thereof. The inward leg portion, 32a or 33a, is engaged with an engaging portion 34 formed on the bottom surface of the lower cassette half 3, and the other outward leg portion 32b or 33b is brought in contact with the inward surface of the lid lock member 29 such that the lid lock member 29 is constantly spring-biased to the outside, i.e., toward the inner surface of the side wall of lower cassette half 3 by the spring force of the leg portion 32b or 33b, and thus lid 5 is held in the locked state.

If the lock releasing protrusion 14 is pressed while lid 5 is locked, lid lock member 29 is inwardly rotated around the shaft portions 30a and 30b against spring-biasing member 32 or 33, whereby the locking protrusion 13 is disengaged from the engaging portion 12 of the lid 5 to thereby release the lid 5 from being locked. At the same time, outer end portion 19a of the tunnel piece 19 is ejected from opening portion 11.

If lock releasing protrusion 14 is no longer pressed, the lid lock member 29 is spring-biased by the spring-biasing member 32 or 33 so that it is rotated toward the side wall of the lower cassette half 3, thereby inserting the outer end portion 19a of the tunnel piece 19 into the opening portion 11 one more time.

As above, in this embodiment, except while lid 5 is opening or closing, outer end portion 19a of the tunnel piece 19 is inserted into the opening portion 11 of the lower cassette half 3. Thus, when lid 5 is open detection light path L again passes through tunnel piece 19, thus preventing light other than that from light emitting portion 10 from being incident upon the light receiving element in the recorder and preventing misdetection of the tape end. And, as above, when lid 5 is closed, dust and other particles are prevented from entering the cassette.

As before, the spring-biasing member 32 or 33 is of a substantially V-shape, with engaging portion 32c or 33c formed at the curved portion. Thus, the construction and assembly is simplified, as spring-biasing member 32 or 33 need only be downwardly engaged onto shaft portion 30a and 30b. Thus, the assembly process can be made with great ease, and the manufacturing cost of a tape cassette of the present invention can be reduced considerably.

As set forth above, according to the present invention, the light leading cover for conducting the detection light path for optical tape end detecting means is formed on the lid lock member. As the lid is opened or closed the outer end portion of the light leading cover is inserted into an opening formed through the side wall of the cassette housing so as to communicate with the light path. Thus, only the detection light, passing through the light path within the cassette housing, is received by the light receiving element in the recorder via the light leading cover, thereby preventing errors in detecting the tape end.

From the above description, it will be apparent that the invention disclosed herein provides a novel and advantageous lid lock member for a tape cassette. The foregoing discussion discloses and describes merely exemplary methods and embodiments of the present invention. As will be understood by those familiar with the art, the invention may be embodied in other specific forms without departing from the spirit or essential characteristics thereof. For example, different types of springs may be used, of different materials, and different shapes of lid lock members are possible under the present invention. Accordingly, the disclosure of the present invention is intended to be illustrative, but not limiting, of the scope of the invention, which is set forth in the following claims.

We claim as our invention:

1. A tape cassette for use with a recording and/or reproducing apparatus, the apparatus having a light emitting element and a light receiving element for optically detecting a tape end, comprising:
   a cassette housing having a front wall with a tape withdrawing mouth and a side wall with an opening corresponding to the location of the light receiving element;
   an aperture for inserting the light emitting element into the cassette housing such that a light path is defined between the light emitting and receiving elements, through the opening in the side wall;
   a lid pivotally supported at both side walls of the housing so as to have an open position and a closed position which respectively uncover and cover the tape withdrawing mouth; and
   a lid lock member for locking the lid at the open position or the closed position, having a light guide which extends over a portion of the light path from the light emitting element to the light receiving element and which is longer than the width of the lid lock member.

2. A tape cassette according to claim 1, further comprising biasing means for biasing the lid lock member to the locked position.

3. A tape cassette according to claim 2, wherein the means for biasing the lid lock member to the lock position comprises a spring.

4. A tape cassette according to claim 3 wherein the light guide of the lid lock member extends into the opening in the side wall which corresponds to the location of the light receiving element when the lid lock member is in the locked position.

5. A tape cassette according to claim 1 wherein the light guide of the lid lock member extends into the opening in the side wall which corresponds to the location of the light receiving element when the lid lock member is in the locked position.

6. A tape cassette according to claim 5 further comprising means for guiding movement of the lid lock member along the light path.

7. A tape cassette according to claim 6 wherein the means for guiding movement of the lid lock member along the light path comprises a slot on the bottom of the lid lock member which is parallel to the light leading member, and a guide member on the bottom of the cassette housing which is parallel to the light path and fits within the slot.

8. A tape cassette according to claim 6 wherein the means for guiding movement of the lid lock member along the light path comprises a rib on the bottom of the lid lock member which is parallel to the light leading member, and a slot on the bottom of the cassette housing which is parallel to the light path and which receives the rib therein.

9. A tape cassette according to claim 6 further comprising means for limiting the vertical movement of the lid lock member.

10. A tape cassette according to claim 9 wherein the means for limiting the vertical movement of the lid lock member comprises a guide member on the inside of the top of the cassette housing over the lied lock member.

11. A tape cassette according to claim 9 further comprising biasing means for biasing the lid lock member to the locked position.

12. A tape cassette according to claim 11 wherein the means for biasing the lid lock member to the locked position comprising a spring.

13. A tape cassette according to claim 6 further comprising biasing means for biasing the lid lock member to the locked position.

14. A tape cassette according to claim 13 wherein the means for biasing the lid lock member to the locked position comprises a spring.

15. A tape cassette according to claim 5 wherein the lid lock member is rotatably mounted on the cassette housing so as to swing inwardly and outwardly such that the light guide extends into the opening in the side wall which corresponds to the location of the light receiving element when the lid lock member is in the locked position.

16. A tape cassette according to claim 15 further comprising biasing means for biasing the lid lock member to the locked position.

17. A tape cassette for use with a recording and/or reproducing apparatus, the apparatus having a light emitting element and a light receiving element for optically detecting a tape end, comprising:
  a cassette housing having a front wall with a tape withdrawing mouth and a side wall with an opening corresponding to the location of the light receiving element;
  an aperture for inserting the light emitting element into the cassette housing such that a light path is defined between the light emitting and receiving elements, through the opening in the side wall;
  a lid pivotally supported at both side walls of the housing so as to have an open position and a closed position which respectively uncover and cover the tape withdrawing mouth;
  a lid lock member for locking the lid at the open position or the closed position, having a light guide which extends over a portion of the light path from the light emitting element to the light receiving element and which is longer than the width of the lid lock member, and which extends into the opening in the side wall which corresponds to the location of the light receiving element when the lid lock member is in the locked position; and
  means for biasing the lid lock member to the locked position.

18. A tape cassette according to claim 17 further comprising means for guiding movement of the lid lock member along the light path.

19. A tape cassette according to claim 18 further comprising means for limiting the vertical movement of the lid lock member.

20. A tape cassette according to claim 19 wherein the means for biasing the lid lock member to the locked position comprises a spring.

* * * * *